US005803646A

United States Patent [19]

Weihrauch

[11] Patent Number: 5,803,646

[45] Date of Patent: Sep. 8, 1998

[54] APPARATUS FOR THE DETACHABLE FASTENING OF CLEANING IMPLEMENTS

[75] Inventor: Georg Weihrauch, Wald-Michelbach, Germany

[73] Assignee: Coronet-Werke GmbH, Wald-Michelbach, Germany

[21] Appl. No.: 765,355

[22] PCT Filed: Jul. 7, 1995

[86] PCT No.: PCT/EP95/02654

§ 371 Date: Dec. 31, 1996

§ 102(e) Date: Dec. 31, 1996

[87] PCT Pub. No.: WO96/01723

PCT Pub. Date: Jan. 25, 1996

[30] Foreign Application Priority Data

Jul. 12, 1994 [DE] Germany .......................... 44 24 428.2

[51] Int. Cl.[6] .......................................................... F16B 2/04

[52] U.S. Cl. .......................... 403/290; 403/314; 403/321; 15/145

[58] Field of Search .................................... 403/314, 321, 403/322, 409.1, 289, 290, 297, 300, 302; 15/145, 143.1; 16/114 R

[56] References Cited

U.S. PATENT DOCUMENTS

| | | | |
|---|---|---|---|
| 4,169,297 | 10/1979 | Weihrauch | 403/290 X |
| 4,237,573 | 12/1980 | Weihrauch | 15/145 |
| 4,455,103 | 6/1984 | Hackenberg | 403/322 X |
| 5,221,154 | 6/1993 | Foulquier et al. | 403/322 X |

FOREIGN PATENT DOCUMENTS

| | | | |
|---|---|---|---|
| 62240 | 10/1982 | European Pat. Off. | 403/290 |
| 2623814 | 12/1977 | Germany | 403/297 |
| 2823209 | 11/1979 | Germany | 15/145 |
| 2921438 | 11/1980 | Germany | 15/145 |

*Primary Examiner*—Harry C. Kim

*Attorney, Agent, or Firm*—Antonelli, Terry, Stout & Kraus, LLP

[57] ABSTRACT

The invention is an apparatus for the detachable fastening of cleaning implements, such as brooms, scrubbing brushes or the like to a stick or handle. The stick is provided at its end with two fork-shaped, resilient arms, which can be fixed in bores of the cleaning implement with the aid of a fixing device. The fixing device comprises a handle, an operating element located between the arms and contact faces which engage the arms and spread the arms outwardly or draw the arms inwardly by rotation or displacement. The contact faces of the operating element are constructed on rotary bearing parts, preferably bearing rollers or rolls, which roll on the arms during the adjusting movement of the operating element.

20 Claims, 3 Drawing Sheets

10
11
12
13
13a
14
15
15a
16
16a
17
18
20
20a
21
21a
D
D1
D2
L
III
IV
V

APPARATUS FOR THE DETACHABLE FASTENING OF CLEANING IMPLEMENTS

BACKGROUND OF THE INVENTION

1. Field of the Invention

The invention relates to an apparatus for the detachable fastening of cleaning implements, such as brooms, scrubbing brushes, etc. to a stick or handle, which at its end has two fork-shaped, resilient arms, which can be fixed by means of a fixing device in bores of the cleaning implement, the fixing device having a handle and an operating element positioned between the arms and which is in engagement with the arms with contact faces which spreads the element outwards or inwards by rotation or displacement.

2. Description of the Prior Art

Numerous handle or stick fastenings are known, which allow a simple and rapid replacement of worn or spent cleaning implements or an interchange between different cleaning implements. DE 2,606,400 C2 describes a stick fastening, in which a toggle body is positioned between the fork-shaped, resilient arms and is mounted in a rotary manner. To the toggle body is connected a handle enabling the user to rotate the toggle body. The toggle body is in engagement with the inside of the arms with contact faces. The contact faces are so shaped that the arms are spread outwards on rotating the toggle body, which leads to a fixing to the cleaning implement. If the toggle body is rotated back, as a result of their resilience the arms can return to their inwardly drawn position.

It has been found that although with the known stick fastening untrained persons can interchange or replace the cleaning implement in simple and rapid manner, there is a risk that over a period of time dirt and dust can collect between the contact faces of the toggle body and the corresponding faces of the arms, so as to significantly increase the friction between these two components, so that relatively high forces must be expended in order to rotate the toggle body and consequently fix the arms. This can make it much more difficult or impossible to use the stick fastening for persons having only limited physical strength.

SUMMARY OF THE INVENTION

The invention provides an apparatus of the aforementioned type in which, even after a long period of time, an easy adjustability is ensured.

In the case of an apparatus for the detachable fastening of cleaning implements, the invention solves the problem of the prior art in that the contact faces of the operating element are constructed on rotary bearing parts, which roll on the arms during the adjusting movement of the operating element.

Thus, according to the invention, the sliding movement occurring in the known construction between the operating element, which is preferably a toggle body fitted to the handle or connected in one piece thereto, and the arms or the resulting sliding friction is replaced by a rolling movement or a rolling friction. It has been found that in this way the user has to apply 30 to 40% lower operating forces for the purpose of adjusting the toggle body and for fixing the arms.

If during the course of time dirt or dust should collect on the rotating bearing parts, which are preferably bearing rollers or rolls, or if the surfaces of the normally metallic arms should corrode, then the rolling behaviour tends to improve, because sliding effects of the bearing parts are avoided. This can also be brought about by roughening the surfaces of the bearing parts and/or the arms.

A good guidance of the arms on the toggle body during the adjusting movement can be ensured by forming on the surface of the bearing parts an all-round depression in which the arms roll.

The bearing parts are preferably mounted in rotary manner on the toggle body, which can be achieved by subsequent fitting, e.g. the cushioning of the bearing parts in the toggle body. However, it is also possible to make the toggle body and the bearing parts from different plastics in a two-component injection moulding process and a single operation, so that separate fitting is rendered unnecessary. The toggle body and the bearing parts should be made from different plastics having a limited mutual friction, so that there is only a limited bearing friction between the components.

If the bearing parts are bearing rollers or rolls, preferably the rotation axis of the bearing rollers or rolls should be perpendicular to the spreading apart direction of the arms.

According to a preferred development of the invention at least two rotary bearing parts are provided, whereof in each case one engages on each arm. The two bearing parts are e.g. arranged in diametrically facing manner with respect to the fulcrum of the toggle body and at least engage with the arms over a considerable part of the pivoting range of the toggle body. If the bearing parts, i.e. the bearing rollers or rolls come free from the arms immediately prior to reaching the inwardly drawn position, then on the toggle body should be provided at least two crossbars with bearing faces, which keep the arms spaced in their inwardly drawn state. This leads to a uniform, troublefree pivoting movement, because the toggle body during pivoting is guided in all positions.

According to a further development of the invention on the bearing parts are made externally visible markings, so that the user can establish during the pivoting movement whether or not the bearing parts are rolling on the arms and, if necessary, can eliminate any impediment to the bearing parts. Preferably the markings should be made on the front face of the bearing rollers or rolls.

Further details and features of the invention can be gathered from the following description of an embodiment with reference to the attached drawings, wherein show:

DESCRIPTION OF THE PREFERRED EMBODIMENTS

Figure 1:
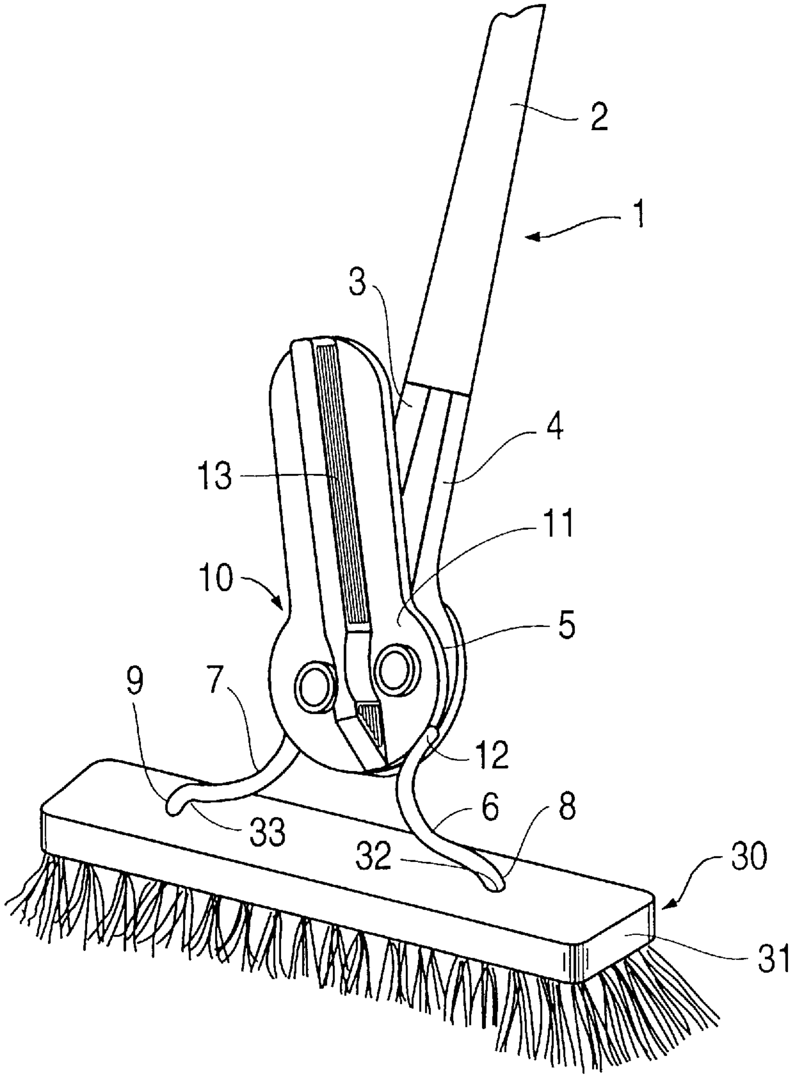
FIG. 1 is a view of a cleaning implement with a fitted stick.

The stick or handle 1 shown in FIG. 1 comprises a tube or tubular portion 2, on whose lower end are fitted two roughly parallel, fork-shaped arms 3 and 4, which in the embodiment have outwardly offset legs 6 and 7 and connected thereto bent ends 8 and 9. The arms 3 and 4 are inserted with their bent ends 8 and 9 in bores 32 and 33, which can be introduced into a bristle body 31 of a cleaning implement 30 in the form of a broom.

Between the arms 3 and 4 is inserted a fixing device 10, which has the handle in the form of an elongated grip 13. The fixing device 10 is shown in detail in FIGS. 2 to 5.

The fixing device 10 comprises a toggle body 17, which is bounded on its underside by a one-piece, lower disk 12 and on its top side by a one-piece, upper disk 11. The upper disk 11 has an elongated shape compared with the lower disk serving as a base for the grip 13, running perpendicular thereto and which is in one piece with the upper disk 11. On the surfaces of the grip 13 are formed longitudinally directed protuberances 14, which are intended to improve the gripping action of the grip. The front, triangular portion 13*a* of the grip 13 serves as a thumb support, so that for the same expended force the torque is increased and operation can be facilitated.

Figures 2, 3, 4, 5:
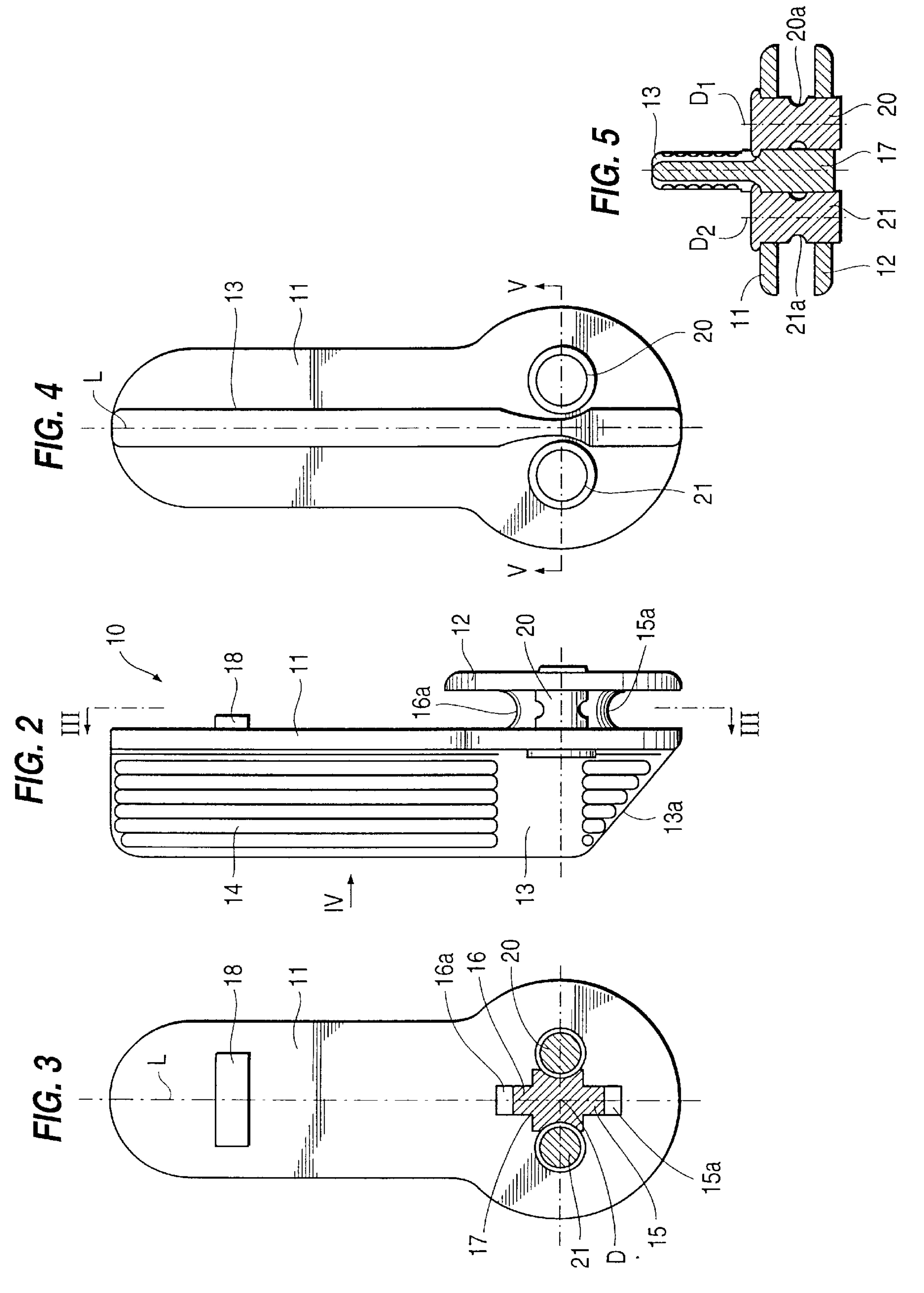
FIG. 2 is a side view of the fixing device.
FIG. 3 is a sectional view along line III—III in FIG. 2.
FIG. 4 is a sectional view along line IV in FIG. 2.
FIG. 5 is a sectional view along line V—V in FIG. 4.

Between the lower disk 12 and the upper disk 11 the arms 3 and 4 are inserted, which are consequently guided between them. In two through-bores diametrically facing with respect to the longitudinal axis L and located in the upper and lower disks 11 and 12 respectively are respectively cushioned bearing rollers 20 and 21, which are held in rotary manner in the through-bores. As shown in FIG. 5, on their circumferential surface the bearing rollers 20 and 21 have in each case an all-round depression 20*a* and 21*a*, in which engage and are guided the arms 3 and 4. The toggle body 17 and bearing rollers 20 and 21 are made from different plastics with a limited mutual friction, so that an easy rotary movement of the bearing rollers 20 and 21 in the toggle body 17 is ensured.

As is in particular shown by FIG. 3, on the toggle body perpendicular to the connecting line between the bearing rollers 20 and 21, i.e. in the direction of the longitudinal axis 11, there are two crossbars 15 and 16 pointing in opposite directions, which at their end have in each case a bearing surface 15*a* and 16*a*. The bearing surfaces 15*a* and 16*a* are nearer the toggle body fulcrum D than the outer faces of the bearing rollers 20 and 21.

Figure 6:
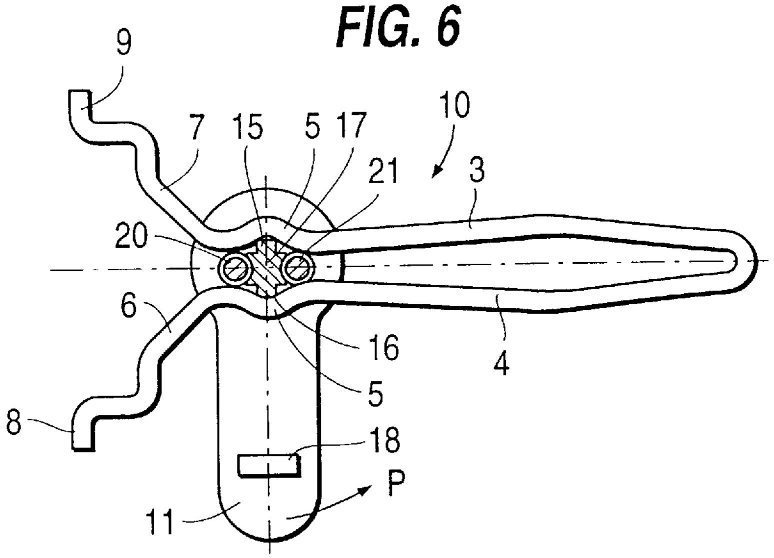
FIG. 6 illustrates the arms with the fixing device in the inwardly drawn state.
Figure 7:
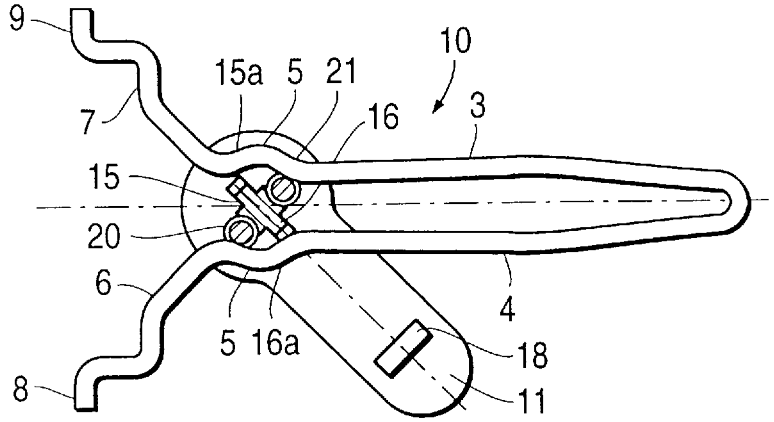
FIG. 7 is an intermediate position of the invention during the pivoting movement.
Figure 8:
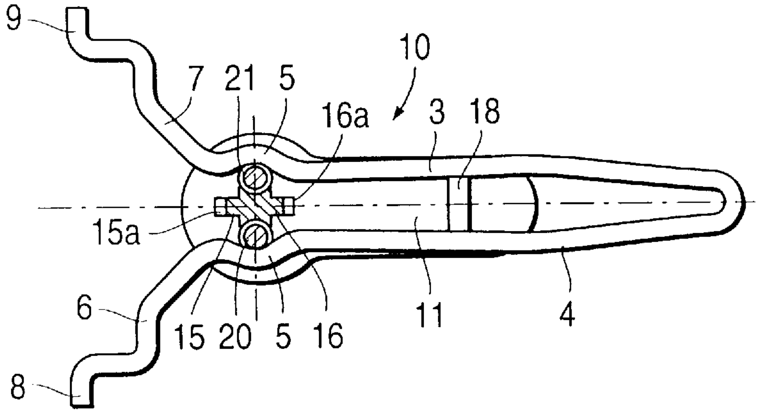
FIG. 8 illustrates the arms with the fixing device in the spread apart state.

FIGS. 6, 7 and 8 show the individual phases of the fixing movement of the arms 3 and 4. In the position shown in FIG. 6 the arms 3 and 4 are in their inwardly drawn position, in which they can be inserted in the bores 32 and 33 of the bristle body 1. The bearing rollers 20 and 21 and the crossbars 15 and 16 are received between outwardly curved offsets 5 of the arms 3 and 4, the arms 3 and 4 engaging on the bearing surfaces 15*a* and 16*a* of the crossbars 15 and 16. By rotating the grip or the toggle body 17 in the direction of the arrow P, the bearing rollers 20 and 21 engage with the inside of the curved offsets 5 of the arms 3 and 4, whereas the bearing surfaces 15*a* and 16*a* of the crossbars 15 and 16 come free from the arms 3 and 4. As the distance between the outer faces of the bearing rollers 20 and 21 is greater than the distance between the bearing faces 15*a* and 16*a* of the crossbars 15 and 16 the arms 3 and 4 are spread apart during the rotation of the toggle body 17, as is apparent from the intermediate position shown in FIG. 7. During the adjusting movement the bearing rollers 20 and 21 roll on the arms 3 and 4, so that only limited friction occurs.

In FIG. 8 is reached the furthest spread apart state of the arms 3 and 4, the two bearing rollers 20 and 21 being substantially perpendicular to the longitudinal direction of the arms 3 and 4 and define their mutual spacing. By means of a projection 18 shaped onto the upper disk 11 and which can snap between the arms 3 and 4, an unintentional adjustment from this spread apart fixed position is prevented.

To release the arms 3 and 4 from their engagement with the cleaning implement, the toggle body 17 is turned back from the position shown in FIG. 8 into the position shown in FIG. 6, the arms 3 and 4, due to their resilience, remaining in constant engagement with the bearing rollers 20, 21 or the bearing surfaces 15*a*, 16*a* of the crossbars 15, 16.

I claim:

1. An apparatus for detachable fastening of cleaning implements comprising:

a handle having two fork-shaped resilient arms, a fixing device for fixing the two resilient arms in bores in the cleaning implements, the fixing device having a handle, a one-piece toggle body coupled to the handle positioned between the arms, and contact faces which engage the arms by spreading the two resilient arms outwardly or drawing the two resilient arms inwardly by rotation or displacement, the contact faces being formed on at least two rotary bearing parts mounted on the toggle body which, during an adjusting movement of the one-piece toggle body, rolls on the arms with at least one rotary bearing part engaging each arm.

2. An apparatus according to claim 1, wherein the at least two rotary bearing parts are either cushioned in or are injection molded on the toggle body.

3. An apparatus according to claim 1, wherein surfaces of at least one of the at least two rotary bearing parts and the arms are roughened.

4. An apparatus according to claim 1, wherein a surface of the at least two rotary bearing parts includes a circumferential depression as a guide for the arms.

5. An apparatus according to claim 1, wherein the toggle body and the at least two rotary bearing parts are made from different plastics having a mutual friction therebetween which permits relative movement.

6. An apparatus according to claim 1 wherein markings, visible to a user, are applied to the at least two rotary bearing parts.

7. An apparatus according to claim 2, wherein the at least two rotary bearing parts are either bearing rollers or rolls.

8. An apparatus according to claim 2, wherein the toggle body has at least two crossbars respectively having a contact face which maintains one of the arms in an inwardly drawn state.

9. An apparatus according to claim 2, wherein surfaces of at least one of the at least two rotary bearing parts and the arms are roughened.

10. An apparatus according to claim 2, wherein a surface of the at least two rotary bearing parts includes a circumferential depression as a guide for the arms.

11. An apparatus according to claim 2, wherein the toggle body and the at least two rotary bearing parts are made from different plastics having a mutual friction therebetween which permits relative movement.

12. An apparatus according to claim 2 wherein markings, visible to a user, are applied to the at least two bearing parts.

13. An apparatus according to claim 7, a rotational axis of the bearing rollers or rolls is perpendicular to a spreading apart direction of the arms.

14. An apparatus according to claim 7, wherein the toggle body has at least two crossbars respectively having a contact face which maintains one of the arms in an inwardly drawn state.

15. An apparatus according to claim 7, wherein surfaces of at least one of the at least two rotary bearing parts and the arms are roughened.

16. An apparatus according to claim 7, wherein a surface of the at least two rotary bearing parts includes a circumferential depression as a guide for the arms.

17. An apparatus according to claim 7, wherein the toggle body and the at least two rotary bearing parts are made from different plastics having a mutual friction therebetween which permits relative movement.

18. An apparatus according to claim 7 wherein markings, visible to a user, are applied to the at least two bearing parts.

19. An apparatus according to claim 13, wherein the toggle body has at least two crossbars respectively having a contact face which maintains one of the arms in an inwardly drawn state.

20. An apparatus according to claim 13, wherein surfaces of at least one of the at least two rotary bearing parts and the arms are roughened.

* * * * *